United States Patent [19]

Beaurepaire et al.

[11] Patent Number: 5,009,124
[45] Date of Patent: Apr. 23, 1991

[54] WRIST PIN

[75] Inventors: Olivier Beaurepaire, Annecy, France; Frederick H. Thompson, Bradford, England

[73] Assignee: AE PLC, Rugby, England

[21] Appl. No.: 485,885

[22] Filed: Feb. 27, 1990

Related U.S. Application Data

[63] Continuation of Ser. No. 325,048, Mar. 16, 1989, abandoned, which is a continuation of Ser. No. 9,897, Feb. 2, 1987, abandoned.

[30] Foreign Application Priority Data

Feb. 13, 1986 [GB] United Kingdom ............... 8603582

[51] Int. Cl.$^5$ .............................................. F16C 3/04
[52] U.S. Cl. .................................... 74/595; 74/579 E; 403/150
[58] Field of Search ............... 74/579 R, 579 E, 595, 74/605; 92/187, 189, 238; 403/150, 153, 151, 154, 152, 155, 156, 161

[56] References Cited

U.S. PATENT DOCUMENTS

| 342,716 | 5/1886 | Steward | 74/579 R |
|---|---|---|---|
| 1,754,753 | 4/1930 | Iselin | 403/151 X |
| 1,789,089 | 1/1931 | Tobler | 403/152 X |
| 1,852,663 | 4/1932 | Matthews | 92/189 |
| 1,950,009 | 3/1934 | Newman | 74/595 |
| 1,961,789 | 6/1934 | Roth | 403/151 |
| 2,849,265 | 8/1958 | Ten Eyck | 403/151 |
| 2,990,226 | 6/1961 | Fangman | 74/595 |
| 3,053,595 | 9/1962 | Dilworth | 92/187 |
| 3,479,929 | 11/1969 | Fangman | 92/187 |
| 3,702,092 | 11/1972 | Zollner | 92/187 |
| 4,359,913 | 11/1982 | Mahlke | 74/579 E |
| 4,461,595 | 7/1984 | Mallas | 74/579 E X |
| 4,505,979 | 3/1985 | Ruegg et al. | 403/150 X |

FOREIGN PATENT DOCUMENTS 3526396 10/1986 Fed. Rep. of Germany .

Primary Examiner—Rodney M. Lindsey
Attorney, Agent, or Firm—William R. Hinds

[57] ABSTRACT

Wrist pins for use in pistons are described. The wrist pin comprises an elongate, substantially hollow member having two spaced-apart convex surface portions of substantially cylindrical or oval curvature, the two convex portions being connected by two walls of different curvature. Because the connecting walls are more nearly in compression and bending loads are minimised a lighter wrist pin for a given application may be produced.

11 Claims, 2 Drawing Sheets

WRIST PIN

This is a continuation of application Ser. No. 325,048 filed Mar. 16, 1989, which is a continuation of Ser. No. 009,897 filed Feb. 2, 1987, now both abandoned.

The present invention relates to wrist pins.

The wrist pin connecting the piston of an internal combustion engine to the connecting rod is one of the most highly stressed components in the engine. Wrist pins need to be able to withstand bending, compression and shear stresses without significant deformation. The pin has to resist significant bending otherwise this will have an adverse effect on the fatigue behaviour of the piston pin bosses. Resistance to what is termed ovalisation is also required otherwise partial seizure, or scuffing, may occur in the pin bosses due to the very small clearances which are generally employed. Ovalisation may also raise tensile hoop stresses in the pin bosses with consequent risk of fatigue. In modern gasoline engines, for example, the compression height of pistons is gradually being reduced thus bringing the piston pins closer to the hot crown. As a result of this, lubrication difficulties are being experienced due to both higher pin boss temperatures and higher loads due to increased engine performance. Some pistons have grooves or reliefs cut into the pin boss bores in an attempt to improve lubrication between the wrist pin and its bore. These grooves, however, are not always successful and are frequently sited in regions where additional bearing support is also required. Furthermore there is an increasing trend towards lighter pistons which results in the wrist pin contributing an increasing proportion of the total piston and wrist pin mass. In some modern engines the wrist pin accounts for 30 to 40% of the total piston mass. In the search for increased engine economy and efficiency, reduction of mass especially reciprocating mass, is always being sought.

Wrist pins generally do not fail catastrophically since of necessity the construction tends to be substantial to ensure that any deformation is elastic. Any increase in wrist pin stiffness is eagerly sought after.

It is an object of the present invention to provide a wrist pin for an internal combustion engine having reduced mass and increased stiffness without significant increase in production cost.

It is a further object of the present invention to provide a wrist pin having inherently improved lubrication in the pin bosses.

According to the present invention a piston wrist pin comprises an elongate, substantially hollow member having two spaced-apart convex portions each having a substantially cylindrical outer curvature and which co-operate with corresponding surfaces in the wrist pin bosses of an associated piston and in the small end of an associated connecting rod and which two spaced-apart convex portions are connected by walls of different curvature to that of the spaced-apart convex portions.

The two convex portions may not necessarily have equal areas. Similarly the wall thickness of the convex portions may be dissimilar or vary through their cross-section.

It has been found with wrist pins of the present invention that thinner wall sections may be employed compared to the section of the convex portions to obtain stiffness comparable with conventional cylindrical wrist pins.

The walls may be concave in form or substantially planar. In some embodiments the walls may themselves be convex but of a greater radius of curvature than the convex portions which form the wrist pin bearing surface.

In order that the invention may be more fully understood examples will now be described by way of illustration only with reference to the accompanying drawings of which:

FIG. 5 shows a second modified form of the wrist pin of FIG. 3a;

Figure 6:
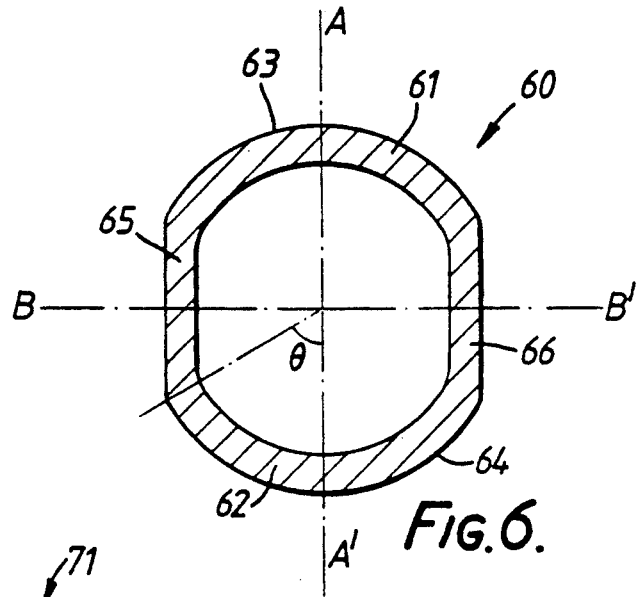
FIG. 6 shows a cross-section of an alternative embodiment of a wrist pin according to the present invention.
Figure 8:
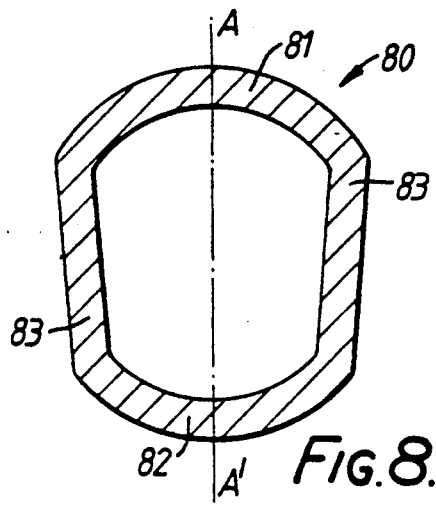

FIG. 8 which shows a modified form of the wrist pin of FIG. 6.

Figure 1:
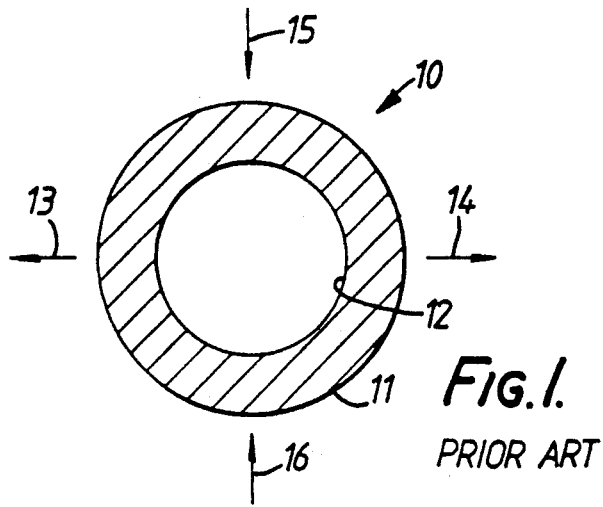
FIG. 1 shows a cross-section of a prior art wrist pin.

Referring now to FIG. 1 which shows a conventional prior art wrist pin 10. Such wrist pins are generally constructed in fully cylindrical form having an outside diameter 11 and an inside diameter 12. The dimensions of the diameters 11 and 12 are chosen so as to minimise or maintain below 25 um the ovalisation which occurs in operation. The ovalisation is manifested as swelling of the wrist pin inner and outer diameters 11 and 12 in the directions indicated by the arrows 13 and 14. This swelling is due to compression of the wrist pin in the directions indicated by the arrows 15 and 16 during combustion of the fuel in the engine cylinder combustion chamber, the rapid pressure increase being transmitted to the wrist pin 10 by the piston (not shown). Because of the very small clearance employed between the piston pin boss bore and the wrist pin outer diameter it is necessary to prevent ovalisation or swelling to very low limits, often as noted above to less than 25 um on wrist pin diameters of less than about 60mm. Excessive ovalisation causes partial seizure or scuffing of the oscillating wrist pin in its pin bore or connecting rod small end either of which or both of which form a bearing surface with the pin surface. Such scuffing causes localised material welding or pick-up which in turn leads to greatly increased wear rates and may eventually cause seizure and consequent failure of the piston in the cylinder bore. To maintain ovalisation to the required low levels in a conventional wrist pin necessitates thicker material sections than would otherwise be the case merely from the point of view of strength to prevent failure.

Figure 2:
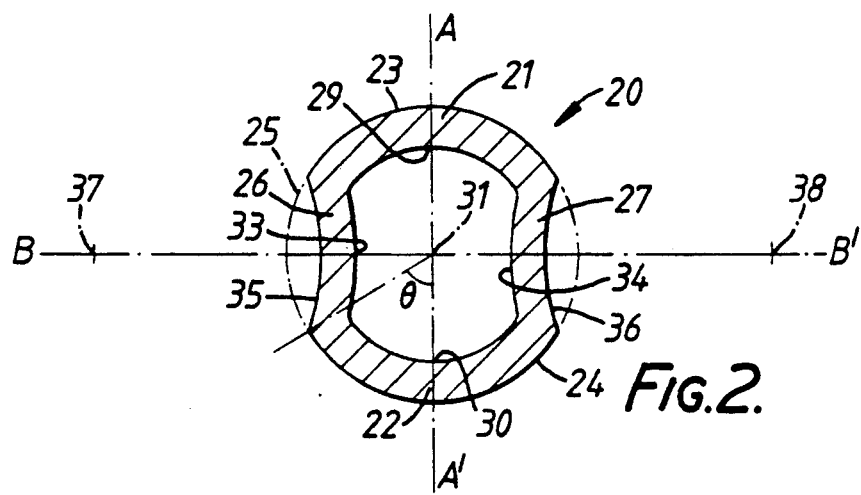
FIG. 2 shows a cross-section of a wrist pin according to the present invention.

Referring now to FIG. 2 and where the wrist pin shown generally at 20 comprises two convex portions 21 and 22 of cylindrical shape and the outer diameters 23 and 24 of each portion 21 and 22 respectively both lie on substantially the same circle 25 (shown as a dashed line). The portions 21 and 22 are joined to each other by inwardly curved, or concave, side walls 26 and 27. The curvature of the side walls in this case is also cylindrical. The portions 21 and 22 each have an inner surface 29 and 30 in addition to the outer surfaces 23 and 24 respectively. In the example shown the centers of curvature of the surfaces 23, 29 and 24,30 are coincident at the line 31 which is also the wrist pin axis. The side walls 26 and 27 have inner surfaces 33 and 34 and outer surfaces 35 and 36 respectively. In this example the centers of curvature of the inner and outer surfaces 33,35 and 34,36 are coincident at lines 37 and 38 respectively.

A wrist pin constructed as shown in FIG. 2 was made for a single cylinder test engine of 80mm bore and 110mm stroke running at 2000 rev/min. The diameter of the circle 25 is 24mm, the thickness of portions 21 and 22 is 2.5mm, the radius of curvature of surfaces 33,34 and 35,36 are 26 and 24mm respectively giving a wall thickness of 2mm. The angle $\theta$ is 60° giving an arc of contact of 120° for each of the portions 21 and 22. The weight of the wrist pin was 85gm and was produced from BS970-En32 steel. The wrist pin was designed to withstand the effect of a peak cylinder pressure of 100 Bar without significant distortion. A conventional wrist pin of the type shown in FIG. 1 when constructed to have an acceptable ovalisation within the tolerance required weighs 157gm in the same material. The pin according to the invention ran for 50 hours before the test was terminated. On examination after the test no signs of wear or scuffing could be detected either on the pin surfaces or in the piston pin boss bores. The wrist pin was fitted with an interference fit in the connecting rod small end, the line $AA^1$ being parallel to the connecting rod axis.

Figure 3:
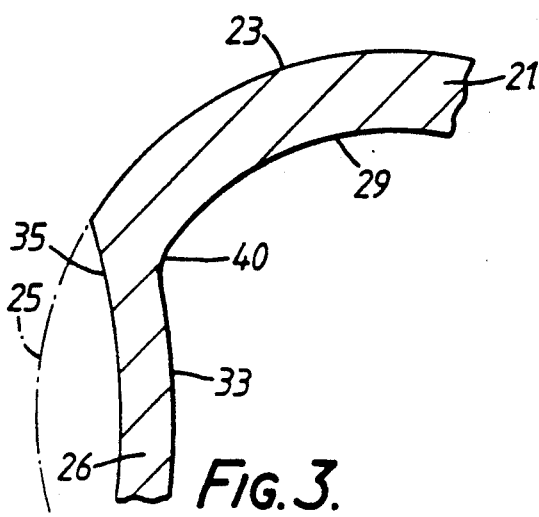
FIG. 3 shows a detail of the junction between the end of one convex surface portion and one concave wall section of the wrist pin of FIG. 2.

In some embodiments, and referring now to FIG. 3, it has been found that at the junctions of the inner surfaces 29,30 of the portions 21,22 and the surfaces 33,34 of the side walls 26,27 that a smoothly-blended portion 40 between adjacent walls is beneficial.

Figure 4:
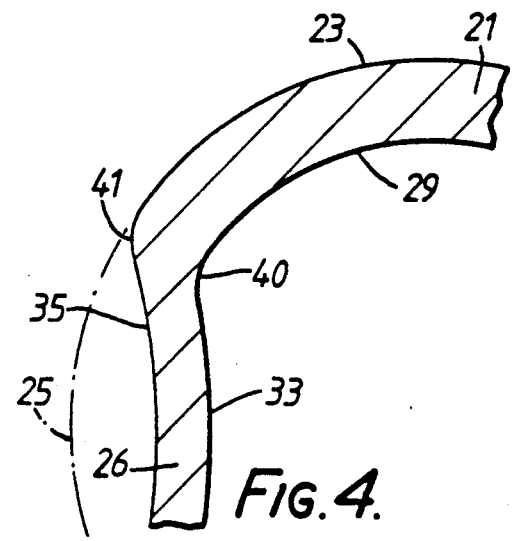
FIG. 4 shows a modified form of the wrist pin of FIG. 3.

In FIG. 4 the junction of the surfaces 23 and 35 are also blended with a small radius at 41 to remove the existing sharp edge at the inter-section of surfaces 23 and 35. The blended portion 41 also aids in the lubrication of the pin boss bores.

Figure 5:
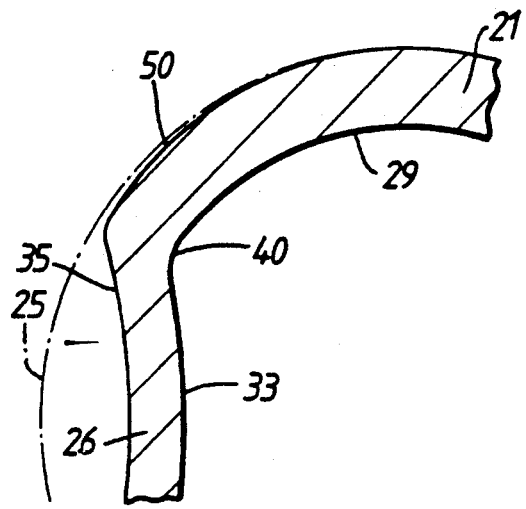

In the example shown in FIG. 5 the outer surface 50 of the portion 21 is formed to a slightly elliptical or oval section. This is to further improve lubrication between the wrist pin and boss.

In the alternative embodiment shown in FIG. 6 the pin is shown generally at 60. The pin has, as in the previous embodiments, two convex portions 61 and 62 of substantially cylindrical outer curvature 63 and 64. In this case, however, the walls 65 and 66 joining the convex portions are substantially planar. Section thickness of the convex portions 61,62 is approximately 2.6mm whilst that of the walls 65,66 is approximately 2.1mm. The angle $\theta$ is 60° giving an arc of contact for portions 61 and 62 of 120° each.

It has been found with wrist pins of the present invention that the recesses formed by the wrist pin flank walls improve the lubrication to the piston pin boss bores due to the fact that these recesses oscillate in the pin bores and are able to collect and distribute copious quantities of oil to the pin boss bore surfaces thus reducing the risk of scuffing.

Because of the side walls 26,27 and 65,66 the degree of ovalisation of the wrist pin is much reduced for any given load. This is due to the fact that the side walls are more nearly in pure compression than the corresponding parts of a conventional pin where the conventional outwardly curved flank portions of a cylindrical pin are effectively loaded with a significant bending moment.

Figure 7:
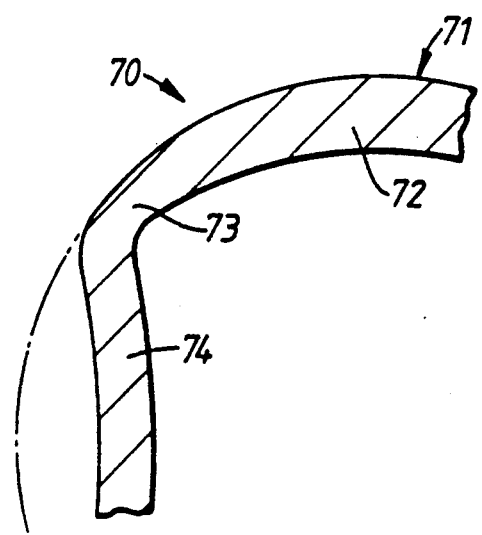
FIG. 7 shows a modified form of the wrist pin of FIG. 2.

FIG. 7 shows a pin 70 having convex portions 71 where the central part 72 of the portion is of greater section than the outer parts 73 which are adjacent the walls 74.

FIG. 8 shows a pin 80 having convex portions 81 and 82 wherein one portion, 81, extends over a greater arc than portion 82 and thus has a greater area. The walls 83 are, therefore, inclined to the axis $AA^1$. The walls 83 are shown as planar walls but may, however, be of curved form as in other embodiments described herein.

The features described with reference to FIGS. 3,4 and 5 may optionally be incorporated into any of the embodiments described herein.

Because the total section area of wrist pins according to the present invention is greatly reduced compared to conventional wrist pins the deflection of the pin in bending over its length is increased. To reduce the possibility of fatigue occurring in the piston pin bosses it may be preferable to produce slightly tapered holes in the pin bosses to accommodate the increased deflection. The pin bores, therefore, may be greatest in diameter at their radially inner ends and smallest at their radially outer ends.

The basic section of the wrist pin may, for example, be produced by extrusion. Known methods of production by extrusion may leave a dividing wall normal to the pin axis approximately in the center of the internal cavity of the wrist pin. The term "substantially hollow" is intended to include this construction.

It is necessary to maintain wrist pins according to the present invention in the correct orientation with regard to the piston. This does not necessarily mean, however, that wrist pins according to the present invention have to be fixed in either the piston or the connecting rod though this may be the case. A certain degree of rotational freedom may be allowed if desired. Rotational freedom of up to $\pm 20°$ either side of the connecting rod axis may be allowed. Such control may, for example, be exercised by the use of plugs which fit the internal shape of the wrist pin and which are able to oscillate between stops formed on the piston skirt adjacent the pin boss bores. Such plugs may, for example, be formed of plastics material and may be retained axially by contact with the wall of an associated cylinder.

The cross-sectional shape of wrist pins according to the present invention may be utilised as an aid in pistons having the wrist pin fixed in the piston pin boss bores by interference fit or other known means. The pin boss bore shape may be produced, for example, by broaching. In such pistons the loading may be borne by the connecting rod small end which may be fitted with a bush of suitable material such as a leaded tin bronze, for example.

We claim:

1. A wrist pin comprising an elongate, substantially hollow member having two spaced-apart convex portions each having a substantially cylindrical outer form and which co-operate with corresponding surfaces in wrist pin bosses of an associated piston and in the small end of an associated connecting rod wherein said convex portions are connected by walls of greater radius of curvature than the radius of curvature of said convex portions.

2. A wrist pin according to claim 1 wherein said walls are of concave section.

3. A wrist pin according to claim 1 wherein said walls are of substantially planar form.

4. A wrist pin according to claim 1 wherein said walls are of thinner section than said convex portions.

5. A wrist pin according to claim 1 wherein at the junctions of said convex portions and said walls the intersecting inner surfaces thereof have a blending radius.

6. A wrist pin according to claim 1 wherein at the junctions of said convex portions and said walls the intersecting outer surfaces thereof have a blending radius.

7. A wrist pin according to claim 1 wherein said two convex portions have different surface areas.

8. A wrist pin according to claim 1 wherein said convex portions have a non-uniform section thickness.

9. A wrist pin according to claim 8 wherein said section thickness is at a maximum about a plane which bisects said convex portions.

10. A wrist pin according to claim 9 wherein said section thickness is at a minimum adjacent the region of intersection of said convex portions and said walls.

11. A wrist pin comprising an elongate, substantially hollow member having two spaced apart convex portions and which co-operate with corresponding surfaces in the wrist pin bosses of an associated piston and in the small end of an associated connecting rod wherein said convex portions have an oval outer profile and are connected by walls of less curvature than the convex portions.

* * * * *